United States Patent Office 3,227,301
Patented Jan. 4, 1966

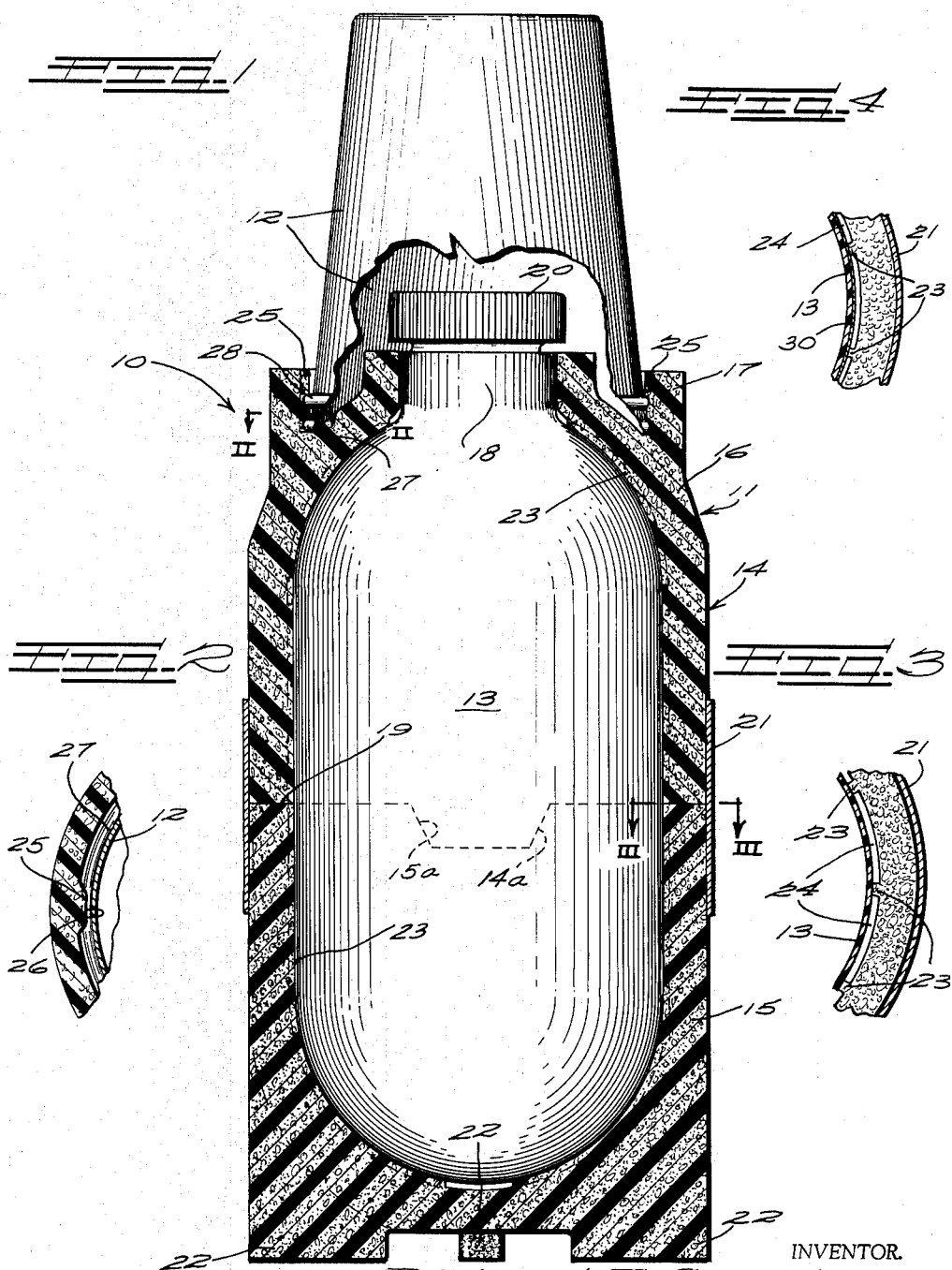

3,227,301
THERMALLY INSULATED BOTTLE ASSEMBLY
Richard T. Cornelius, Minneapolis, Minn., assignor to The Cornelius Company, Anoka, Minn., a corporation of Minnesota
Filed Dec. 26, 1963, Ser. No. 333,481
10 Claims. (Cl. 215—13)

This invention relates generally to thermally insulated bottles, and more specifically to a low-cost, lightweight, nonbreakable, disposable beverage vending package for hot or cold beverages.

Although the principles of the present invention may be included in various thermally insulated bottle assemblies, a particularly useful application is made in a bottle assembly of such construction as to be commercially worthwhile as a throw away bottle. In particular, bottles having a fluid capacity on the order of a pint or a quart may be filled with hot coffee and sold from a central location to the consumers, such as at entrances to ball parks, stadiums, and the like.

The present invention contemplates the utilization of low-cost construction so that the concessionaire can afford to include the price thereof with the product sold. Further, the construction utilized is thermally so efficient that the product temperature will be satisfactory, even though a considerable time may elapse between filling and consumption. Further, the construction is sufficiently rugged to withstand dropping, either full or empty, without functional damage. Other uses and markets will suggest themselves to those familiar with the art.

In the preferred embodiment, the present invention includes a plastic liner bottle which is enclosed by a heat insulative jacket. The heat insulative jacket is provided with means for frictionally supporting a plurality of cups which form a part of the vending package, with a product label which mechanically holds sections of the jacket together, and with internal ribbing which enables the utilization of commercially available liner bottles.

Accordingly, it is an object of the present invention to provide a beverage vending package.

Another object of the present invention is to provide a thermally insulated bottle or bottle assembly.

Yet another object of the present invention is to provide a thermally insulated bottle which has one or more of the features of nonbreakability, low construction cost, and lightweight construction.

Yet another object of the present invention is to provide a throw away bottle which is thermally insulated.

A still further object of the present invention is to provide novel means by which one or more cups is retained on the bottle assembly.

A still further object of the present invention is to provide means for thermally insulating bottles which are of non-insulated construction but commercially available.

A still further object of the present invention is to provide a construction by which a product label or similar element is used to retain portions of a thermal-bottle-insulating jacket together.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIG. 1 is a cross-sectional view of a beverage vending package including a thermally insulated bottle or bottle assembly provided in accordance with the principles of the present invention;

FIG. 2 is a fragmentary cross-sectional view taken along line II—II of FIG. 1;

FIG. 3 is a fragmentary cross-sectional view taken along line III—III of FIG. 1; and FIG. 4 corresponds to FIG. 3 and illustrates a structural variation of the invention.

As shown on the drawings:

The principles of this invention are particularly useful when embodied in a beverage vending package such as illustrated in FIG. 1, generally indicated by the numeral 10. The beverage vending package 10 includes a thermally insulated bottle or bottle assembly 11 on which there is supported one or more cups 12.

The thermally insulated bottle 11 includes a plastic liner bottle 13 disposed within a heat insulative jacket generally indicated at 14. The heat insulative jacket 14 includes a pair of abutting sections, namely a lower section 15 and an upper section 16. The upper section 16 has a flange 17 which is so constructed as to support the cups 12.

The plastic liner bottle 13 preferably comprises polyethylene, and includes a neck 18 on which there is threaded a removable cap 20. The body of the bottle 13 is relatively thin. Such bottles are known in the art, are produced by blow molding, and are commercially inexpensive to manufacture or purchase. Such a bottle has a body which is ordinarily deemed to be too flexible for use in an unsupported manner.

Such support is provided by the jacket 14 which further provides heat insulation. To that end, the jacket 14 preferably comprises expanded polystyrene, a material which is rigid, but which is yieldable in response to a highly concentrated force, especially where a cross-sectional configuration is provided which in size corresponds to a small number of expanded polystyrene pellets.

The lower section 15 and the upper section 16 of the jacket 14 abut each other along a line of abutment 19, and form a snug fit with the bottle liner 13 as illustrated. With the cap 20 removed, the mass of liquid in the liner bottle 13 could cause the liner bottle 13 to separate from the upper jacket section 16. To preclude such occurrence, there is provided a label 21 which is secured to both of the sections 15, 16 in spanning relation to the abutting portions, namely in spanning relation to the line of abutment 19, such label 21 thus holding the sections 15, 16 together. The thickness of the label is exaggerated on the drawing for clarity of illustration. It may comprise pressure sensitive tape, and preferably includes suitable outwardly directed imprinting identifying the product to be sold. Preferably, there should be a bond formed such as by cement between the label 21 and the sections of the jacket 14.

The lower section 15 is provided with a number of feet 22 so that the bottle assembly 11 may rest in an upright manner on a horizontal support surface.

Each of the jacket sections 15 and 16 is provided with a series of ribs 23 which project in a radially inward direction from the interior surface of the jacket sections 15, 16, thereby defining dead air spaces 24 between the points of support provided by such ribs 23. The ribs of the two jacket sections 15, 16 will ordinarily be provided so that they are aligned with each other. However, such alignment is not necessary. Thus, the internal integral ribs 23 engage and support the bottle liner 13.

The flange 17 encircles the axis of the neck 18, and more specifically extends about and is adjacent to the neck 18 in radially spaced relation thereto. Preferably, the flange 17 is cylindrical and is integral with the upper jacket section 16.

The flange 17 is provided with a series of ribs 25, each having an inner face 26 directed toward the axis of the neck 18. Preferably such ribs 25 are integral with the flange 17, there being at least three such ribs. Each of the ribs 25 extends in an axial direction, and each face 26 is parallel to the faces 26 of the other ribs 25. Each of the ribs 25 is resiliently yieldable so that as the cups 12 are squeezed into and received by the cylindrical flange 17, the ribs 25 yield slightly, such yielding being shown in exaggerated form in the drawing for clarity of illustration.

FIG. 1 shows a first cup 12 having a lip 27 and a second cup 12 having a lip 28 received internally within and frictionally engaged by the flange 17, and more specifically frictionally removably engaged by the various faces 26 of the ribs 25. Each cup 12 is thus individually held by its lip or rim, and the neck of the bottle liner extends upwardly within and is enclosed by such cups 12.

Referring to FIG. 4, the bottle liner 13 may be jacketed by a layer of foil 30, such as of aluminum. The thickness of the foil 30 is exaggerated in the drawing. The addition of such foil slightly increases the thermal efficiency of the device at a slight sacrifice in cost.

The bottle assemblies 11 are assembled before they are filled with liquid, and thereafter the cap 20 and the cups 12 are placed in position thereon.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A liner bottle having a neck encircled by an adjacent radially spaced cylindrical flange of expanded polystyrene, said flange having a series of at least three ribs integral therewith and extending in an axial direction, and having faces directed toward the bottle axis, said faces being jointly frictionally engageable with the lip of a neck-enclosing cup; a heat insulative jacket comprising expanded polystyrene enclosing said bottle, said jacket comprising two abutting sections, said neck extending from one of said sections, and said flange benig integral with said one section; and a label secured to both of said sections in spanning relation to the abutting portions thereof and holding said sections together.

2. A thermally insulated bottle assembly comprising:
(a) a liner bottle having a neck;
(b) a heat insulative jacket enclosing said bottle, said jacket comprising two abutting sections, said neck extending from one of said sections; and
(c) a label secured to both of said sections in spanning relation to the abutting portions thereof and holding said sections together.

3. A thermally insulated bottle assembly comprising:
(a) a liner bottle having a neck;
(b) a heat insulative jacket of expanded polystyrene enclosing said bottle, said jacket comprising two abutting sections from which said neck extends; and
(c) said jacket sections each having a series of internal integral ribs directly engaging and supporting said bottle and defining dead air spaces therebetween.

4. A package for vending a beverage, comprising in combination:
(a) a plastic liner bottle having a neck;
(b) a cylindrical flange of expanded polystyrene encircling said neck and radially spaced therefrom, said flange having a series of at least three ribs integral therewith and extending in an axial direction, said ribs having faces directed toward the bottle axis;
(c) a heat insulative jacket comprising two abutting sections of expanded polystyrene enclosing said bottle, said neck extending from one of said sections, and said flange being integral with said one section;
(d) a label secured to both of said sections in spanning relation to the abutting portions thereof and holding said sections together;
(e) said sections of said jacket having a series of internal integral ribs engaging and supporting said bottle and defining dead air spaces therebetwen; and
(f) a plurality of nested cups each having a lip, said cups being removably retained individually on said bottle by frictional engagement between said lips and said faces.

5. A liner bottle having a neck encircled by an adjacent cylindrical flange of expanded polystyrene which is radially spaced from said neck, said flange having a series of at least three ribs integral therewith and each extending in a direction parallel to the axis of said neck, said ribs having faces each directed toward the bottle axis, said flange being integral with and projecting from a heat-insulative jacket directly engaging and substantially totally enclosing said bottle and from which said neck extends, said faces being jointly frictionally engageable with the outer side of the lip of a neck-enclosing cup.

6. A liner bottle having a neck encircled by an adjacent cylindrical flange of expanded polystyrene which is radially spaced from said neck, said flange having a series of at least three ribs integral therewith and each extending in a direction parallel to the axis of said neck, said ribs having faces each directed toward the bottle axis, said faces being jointly frictionally engageable with the outer side of the lip of a neck-enclosing cup, said flange being integral with and projecting from a heat-insulative jacket directly engaging and substantially totally enclosing said bottle and from which said neck extends, and said jacket having a series of internal ribs directly engaging and supporting said bottle and defining dead air spaces therebetween.

7. A bottle assembly comprising: a bottle having a neck, a separate tubular flange fixedly carried on said bottle and encircling the axis of said neck in radially spaced relation to said neck, said tubular flange having an internal cross-sectional size at a right angle to said axis which is substantially uniform throughout the extent of the flange, the inner surface of said tubular flange at any point along its length being frictionally engageable with the lip of a cup at the maximum diameter of such lip.

8. A bottle assembly comprising: a bottle having a neck encircled by a flange having a series of at least three ribs each extending in a direction parallel to the axis of said neck, and each rib having an inner face disposed a constant distance from said axis throughout its extent, said inner faces being jointly frictionally engageable with the lip of a neck-enclosing cup at the maximum diameter of such lip.

9. A bottle assembly comprising: a bottle having a neck encircled by a flange having a series of at least three ribs each extending in a direction parallel to the axis of said neck, and each rib having an inner face disposed a constant distance from said axis throughout its extent, said inner faces being jointly frictionally engageable with the lip of a neck-enclosing cup at the maximum diameter of such lip, said ribs comprising material which is resiliently yieldable in response to such joint engagement with the cup.

10. A bottle assembly having a neck, a separate tubular flange fixedly carried on said botle and encircling the axis of said neck in radially spaced relation to said neck, said tubular flange having a series of at least three projecting ribs disposed on the inner surface thereof, and each rib extending in a direction parallel to the axis of said neck, and each rib having a face disposed a constant distance from said axis throughout its extent, said faces being jointly frictionally engageable with the lip of a neck-enclosing cup at the maximum diameter of such lip.

References Cited by the Examiner

UNITED STATES PATENTS

| | | | |
|---|---|---|---|
| 1,261,450 | 4/1918 | Smith | 215—12 |
| 3,069,041 | 12/1962 | Masso et al. | 220—9 |
| 3,076,575 | 2/1963 | Leslie-Smith | 215—13 |
| 3,120,319 | 2/1964 | Buddras | 215—13 |

FOREIGN PATENTS 1,205,848   2/1960   France.

JOSEPH R. LECLAIR, *Primary Examiner.*

FRANKLIN T. GARRETT, GEORGE O. RALSTON, *Examiners.*